United States Patent [19]
Pelton

[11] Patent Number: 4,685,822
[45] Date of Patent: Aug. 11, 1987

[54] STRENGTHENED GRAPHITE-METAL THREADED CONNECTION

[75] Inventor: John F. Pelton, Yorktown Heights, N.Y.

[73] Assignee: Union Carbide Corporation, Danbury, Conn.

[21] Appl. No.: 863,615

[22] Filed: May 15, 1986

[51] Int. Cl.[4] .............................................. F16B 21/20
[52] U.S. Cl. .................... 403/343; 403/404; 411/132; 411/258; 266/235
[58] Field of Search ............ 403/343, 404, 30, 28, 403/257, 261, 335, 360; 411/132, 133, 136, 147, 160, 166, 184, 185, 186, 258; 266/235

[56] References Cited

U.S. PATENT DOCUMENTS

| | | | |
|---|---|---|---|
| 2,079,692 | 5/1937 | La Pointe | 403/343 X |
| 2,879,092 | 3/1959 | Hargrove et al. | 403/404 X |
| 4,040,610 | 8/1977 | Szekeley | 266/235 |
| 4,191,486 | 3/1980 | Pelton | 403/28 |
| 4,362,411 | 12/1982 | Asberg | 403/5 |
| 4,362,419 | 12/1982 | Duncan | 403/343 |
| 4,419,925 | 12/1983 | Tsuzuki et al. | 403/343 X |
| 4,519,747 | 5/1985 | Yamazaki et al. | 403/259 X |
| 4,598,899 | 7/1986 | Cooper | 266/235 X |

Primary Examiner—Richard J. Scanlan, Jr.
Assistant Examiner—Joseph A. Fischetti
Attorney, Agent, or Firm—A. H. Fritschler

[57] ABSTRACT

The threaded connection between a graphite shaft and a metal shaft, such as is used to drive a rotating nozzle in the refining of aluminum, is strengthened by coating the graphite surface that contact the flange portion of the metal shaft prior to the fastening of said shafts together. The coating of said graphite shaft serves to greatly strengthen the threaded connection and the ability of said connection to transmit driving torque from the metal shaft to the graphite shaft.

28 Claims, 1 Drawing Figure

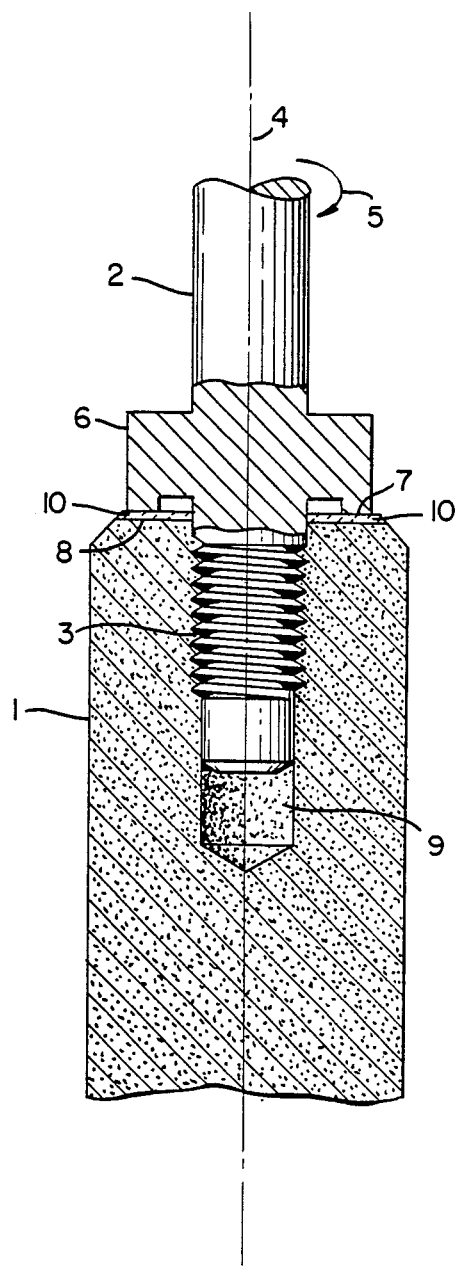

STRENGTHENED GRAPHITE-METAL THREADED CONNECTION

BACKGROUND OF THE INVENTION

1. Field of the Invention

This invention relates to threaded connections. More particularly, it relates to the increasing of the torque strength of a threaded connection between a graphite shaft and a metal shaft.

2. Description of the Prior Art

In the refining of aluminum, a rotating nozzle is commonly employed to disperse a refining gas into a body of molten metal contained in a refining vessel. For this purpose, a graphite rotor that thus disperses the refining gas into the molten aluminum is carried on, and is driven by, a graphite shaft. In turn, this graphite shaft is fastened to, and is driven by, a metal shaft, commonly comprising Inconel alloy. These two shafts are fastened together by a threaded connection that must hold the shafts in proper alignment with each other so that they can rotate as one unitary structure. This joint of the two shafts must also transmit the required driving torque from the metal shaft to the graphite shaft. The Pelton patent, U.S. Pat. No. 4,191,486, discloses and illustrates such a threaded connection and the low strengths thereof encountered at elevated temperatures because of the different coefficients of thermal linear expansion of the graphite and metal parts.

In addition to the steady average torque required to drive the rotor in the molten aluminum, additional unsteady shock loads are encountered as a result of changing liquid circulation patterns within the refining vessel and the striking of the rotor by solid objects, undesired but sometimes present in the body of molten metal nevertheless. Such unsteady shock loads can be even greater than, and add to, the normal, steady driving torque referred to above.

The resulting overall torque loads on such threaded connections are high, such as to frequently result in the breaking of the metal graphite joint. This usually occurs by the stripping out of the threads of the graphite shaft. In some instances, however, the graphite shaft becomes cracked in the threaded area thereof. In any event, such failure of the threaded connection is obviously undesired, leading to costly down time, the need for replacement of the graphite shaft, and overall inconvenience and expense in the carrying out of the aluminum refining operation.

It is an object of the invention, therefore, to provide an improved threaded connection between said graphite shaft and the metal shaft employed for the driving thereof.

It is another object of the invention to provide a strengthened threaded connection between a graphite shaft and a metal shaft.

It is another object of the invention to provide a threaded connection between a graphite shaft and a metal shaft having an enhanced ability to transmit driving torque.

It is a further object of the invention to provide a method for the achieving of a joint between threaded graphite and metal shafts having an enhanced ability to transit a driving torque from said metal shaft to said graphite shaft.

With these and other objects in mind, the invention is hereinafter described in detail, the novel features thereof being particularly pointed out in the appended claims.

SUMMARY OF THE INVENTION

The threaded connection of the invention comprises said metal shaft and said graphite shaft fastened together after the application of a thin layer of a refractory or like cement to the end surface of the graphite shaft that contacts the flange portion of the metal shaft upon the screwing together of the two parts. The cement is allowed to bond to the graphite, but not to the flange of the metal shaft.

BRIEF DESCRIPTION OF THE INVENTION

The invention is hereinafter described with particular reference to the accompanying cross-sectional drawing of a typical embodiment of the invention.

DETAILED DESCRIPTION OF THE INVENTION

The objects of the invention are accomplished, without the necessity for any radical change in the design of the threaded connection or for any increase in the size of the metal and/or graphite shaft portions thereof, by greatly increasing the friction coefficient between the end surface of the graphite shaft and the flange portion of the metal shaft. This is achieved by applying a thin layer of refractory cement to the end surface of the graphite shaft where it contacts the flange of the metal shaft upon completion of the threaded connection between the two parts. As a result of the greatly increased friction coefficient between the refractory coating placed on said graphite surface and the flange portion of said metal shaft, as compared with the friction between the uncoated graphite and said metal shaft flange in a conventional threaded connection between the parts, the torque strength of the threaded connection is increased. This advantageous feature is found to enable the threaded connection of the invention to have a substantially increased ability to transmit torque, as when the threaded connection is employed for the subject aluminum refining purposes.

In the process of modifying a conventional graphite shaft to achieve the benefits of the invention, it will thus be understood that a thin layer of refractory cement need only be applied to the portion of the end surface of the graphite shaft where it contacts the flange portion of the metal shaft when the two parts are assembled by being screwed together as a unitary structure. While the overall upper end portion of the graphite shaft may conveniently be coated with the cement, such coating apart from the specific portion of the graphite in contact with the flange portion of the metal shaft is not required for purposes of the invention. Attention is further called to the feature of the invention whereby the coating of cement is applied only to the graphite surface, not to both of the contacting graphite and metal surfaces. Thus, in the practice of the invention, the coating placed on the graphite surface is allowed to dry completely before the parts are assembled. As a result, the cement is bonded to the graphite, but not to the metal of the shaft flange. This enables the friction to pertain between the refractory coating on the graphite material and the metal of the metal shaft flange, with this friction resulting in the strengthening of the threaded connection and the substantial increase in the torque strength thereof.

Referring to the drawing, a graphite shaft with a female thread is represented by the numeral 1, and is connected to a metal shaft 2 having a male thread by means of the threaded connection therebetween represented overall by the numeral 3. The shafts will be seen to have coincidental axes on center line 4. In practice, metal shaft 2 is driven in such a direction 5 as to tighten the joint between the shafts against resistance to rotation of graphite shaft 3. Metal shaft 2 is constructed with a flange portion 6 that provides a lower seating surface 7 that contacts a portion of the upper end surface 8 of graphite shaft 1 upon fastening of the shafts through threaded connection 3 in the opening 9 of said graphite shaft 1.

The desired increase in torque strength of the threaded connection is accomplished by applying a thin layer 10 of refractory cement to the said upper end surface 8 of graphite shaft 1 in the portion thereof that comes into contact with lower seating surface 7 of metal shaft 2 when the two shafts are screwed together to provide the desired threaded connection. Coating 10 is allowed to dry completely before the two shaft parts are assembled. Thus, the cement is bonded to the graphite surface, but not to the metal shaft flange seating surface 7. The substantial increase in the ability of the threaded connection of the invention to transmit torque, as compared to such a threaded connection not prepared by incorporation of the coating procedure of the invention, is caused by the greatly increased friction coefficient between the refractory coating in the graphite surface and the metal surface of said flange portion 6 of the metal flange as compared with the friction between the untreated graphite surface and the metal shaft flange in a conventional metal graphite threaded connection.

Those skilled in the art will appreciate that any conveniently available refractory cement or like coating material capable of providing an increase in friction with the metal flange surface as compared with that provided by untreated graphite can be employed in the practice of the invention. Illustrative of such coating materials is Zircar Alumina Cement produced by Zircar Products Co. of Florida, N.Y. This refractory cement is described as comprising 70% alumina in a combination of milled fibers and sub-micron particles, together with a small amount of an aluminum organic derivative to enhance its bonding characteristics, in a water-based binder composition. The cement can be applied in its as received condition. It has been found somewhat easier to apply a smooth, uniform coating, however, if the cement is ground to break up some of the small agglomerates therein and is then screened through about 100 mesh screening. In either case, the cement is applied to the end of the graphite shaft by pressing a brush of material against the slowly rotating shaft, with a rotation of in the order of about 150 rpm having been found convenient in particular applications. A flat synthetic fiber artist brush is convenient and is found to function well for this purpose. This method of coating assures that the coating will be of fairly uniform thickness around any circular path and hence the application of the coating will not destroy the necessary accuracy of the surface being coated. It should be noted that the entire upper end surface of graphite shaft 1, i.e., upper end surface 8, can be coated for convenience of operation, as is shown in the drawing. For purposes of the invention, however, it will be appreciated, as indicated above, that it is only necessary to coat the portion of said upper end surface 8 that comes into contact with lower seating surface 7 of said metal flange 6.

The coating of said upper end graphite surface is usually, but not necessarily, accomplished by applying the coating in two operations that can be performed without any appreciable time period therebetween. For example, it is convenient to carry out such operations in practical commercial embodiments about 1/6 to ½ minute apart. Some of the binder phase of the first coating application is absorbed by the porosity of the graphite being coated, and the second coating application serves to replace such absorbed material. The coating of the invention is allowed to air dry before use, and no special drying or baking operation is required.

The coating as applied in the practice of the invention has typically been found to be about 1.2 to 1.4 mils thick when the cement used has been ground and screened as indicated above, and about 1.4 to 1.9 mils thick when the cement is used in its as-received condition from the supplier thereof. Such thickness is measured over the original graphite surface. It will be appreciated that some penetration of the coating material into the pores of the graphite occurs so that the total thickness of the coating will be greater than indicated above in some parts of the treated surface.

Those skilled in the art will appreciate that various changes and modifications can be made in the details of the invention as herein described without departing from the scope of the invention as set forth in the appended claims. For example, the metal and graphite shafts used in the practice of the invention are generally constructed as illustrated in the drawing for practical operating purposes. It should be understood, however, that the joint therebetween could also be made by providing a graphite shaft having a male thread, and graphite shaft having a shoulder for contact with the metal shaft upon tightening of the joint, and a metal shaft having a female thread. In this case, the coating applied in the practice of the invention would be applied to the flat contacting surface of the shoulder of the graphite piece.

Illustrative examples of other refractory cement compositions that can be employed in the practice of the invention are coating materials referred to herein as No. 1 Mixture and No. 2 Mixture. Both mixtures use sodium silicate as a binder. The No. 1 Mixture has the following composition:

| | |
|---|---|
| Cab-O-Sil silica | 0.5 g |
| Sodium silicate solution (18% solids) | 10.0 g |
| Buehler levitated alumina 6435AB | 2.0 g |
| Buehler 40-6625 AB 25u alumina | 1.0 g |
| Ivory liquid | 1 drop |

The Cab-O-Sil silica is employed to make the coating mixture thick and easily painted on the graphite surface. It also serves to keep the binder liquid from being removed from the coating rapidly by the capillary action of the porous graphite. The alumina powders provide the high friction characteristic desired, with the levitated alumina also assisting in the spreadability of the mixture. The Ivory Liquid assures wetting of all powder particles and the wetting of the graphite by the mixture. No special order of addition, and no particular mixing techniques are required for the preparation of the mixture. The coating as conveniently applied and dried typically measures about 0.6 mils thick over the original graphite surface, as compared with the thicker coatings obtained upon use of Zircar Alumina Cement. This thickness does not include material that has penetrated and filled the surface pores of the graphite. As compared with said Zircar Alumina Cement, said No. 1 Mixture has the disadvantage that it tends to separate into a solid and a liquid phase in a few hours and that it gels in a day or so. Thus, it should generally be freshly mixed within a few hours of its intended use.

The No. 2 Mixture has the following composition:

| Cab-O-Sil silica | 0.5 g |
|---|---|
| Sodium silicate solution (18% solids) | 10.0 g |
| Buehler 40-6625 AB 25u alumina | 2.0 g |
| Buehler B (Linde B Alumina) | 0.5 g |
| Buehler levitated alumina 40-6435AB | 5.0 g |
| Ivory liquid | 1 drop |

This mixture can be mixed in the same manner as said No. 1 Mixture and has similar properties when applied to graphite.

Those skilled in the art will appreciate that the material combinations referred to above are illustrative of the types of cement that can be used in the practice of the invention. In general, the refractory cement used for the practice of the invention should comprise (1) a powdered material with individual particles that do not melt, disintegrate, or break up under the conditions of operation; (2) a binder phase that will hold the particles together and also bond them to the graphite, said binder retaining its strength at operating conditions, (3) the combination of said powdered material and binder phase being one available in easily spreadable form, and (4) said cement having, or being made to have, limited absorption of the liquid binder phase into the graphite porosity. The thickness of the coating applied will be understood to vary somewhat depending upon the characteristics of the particular coating employed in any particular application with thicknesses of from about 0.5 mil up to about 2 mils being generally satisfactory as will be seen from the illustrative examples above.

The invention has been demonstrated in various illustrative tests. It should be understood that such tests, and the results thereof, as presented herein are for such illustrative purposes only, and should not be construed as limiting the scope of the invention as recited in the claims. In order to evaluate joint torque strength, an assembly was made to provide a threaded connection as shown in the drawing. Normally, the graphite shaft is held stationary, while torque is applied to the metal shaft with a torque wrench. The torque required to break the joint is noted. This test is generally made at room temperature in air for a first evaluation. This is followed by tests at 350° C. or 450° C. in argon, or argon containing a small amount of chlorine, to simulate actual use conditions.

One of the factors to be considered in the making of such tests lies in the fact that there is a factor of about 2 in torque strengths of joints made with different starting graphite materials. For example, the particular joint most frequently used shows a room temperature torque strength ranging from 25 to 50 foot pounds. The major concern, of course, is with joints having torque strengths in the low end of the scale. In order to properly evaluate the effectiveness of the coating of the invention, two or more samples were made from the same piece of graphite, with one sample being tested in its untreated, as-is condition in air at room temperature, and the other or others being coated and tested at various conditions for comparative purposes. The threaded connections that employed graphite shafts treated in accordance with the invention using the Zircar Alumina Cement referred to above were found to be from about 65% to about 115% stronger than the similar joints made using uncoated graphite. The greatest increase in torque strength was found to occur with respect to the weaker starting materials. This desirable increase in torque strength persisted when the joint was tested at 350° C. to 450° C. in argon plus 3.6% chlorine, common temperature and atmosphere operating conditions.

In a comparative test employing the No. 1 Mixture referred to above, a threaded connection in which untreated graphite was employed failed at 39 foot pounds of torque at room temperature. A comparative joint in which the contacting surface of the graphite was coated with said mixture, measuring 0.5 mils, was tested at 350° C. in said argon plus 3.6% of chlorine atmosphere and was found to have a substantially higher torque strength, said threaded connection of the invention failing at 85 foot pounds.

In a series of additional tests, a single graphite piece was tested at room temperature and was then cut into samples for high temperature testing. Each set of samples tested consisted of two pieces machined so that the threaded ends thereof were taken from adjacent locations in the original graphite piece. An original piece was tested at room temperature, and the thread failed at a torque of 40 foot pounds. Four pieces were cut from this original piece and were tested in two comparative sets of uncoated and Zircar cement coated pieces as follows at 350° C. in air: In Set No. 1, the uncoated piece failed at a torque of 49 foot pounds, while the piece coated in accordance with the invention reached a torque of 80 foot pounds without failure at the time the test was stopped. Set No. 2 produced a similar result with the uncoated piece failing at 40 foot pounds, while the coated piece reached said 80 foot pounds without failure at the time the test was stopped.

Another single graphite piece that failed at 39 foot pounds in room temperature tests was cut into four pieces and was tested in two additional sets of comparative tests at 350° C. in air. In the Set No. 3 tests, the uncoated piece failed at a torque of 40 foot pounds, and in Set No. 4, the uncoated piece failed at 43 foot pounds. In the Set No. 3 and the Set No. 4 tests, the coated piece did not fail, and the tests were stopped at a torque of 80 foot pounds. The coated samples from Sets No. 1-4, which did not fail in said comparative tests, were then machined to remove the coating and to expose fresh graphite. Two of such newly prepared samples were then coated with said Zircar cement, and the four pieces, two coated and two uncoated, were then tested at 350° C. in argon plus 3.6% chlorine. In such tests, the uncoated samples from Set Nos. 1 and 2 failed at a torque of 55 foot pounds, while the corresponding coated samples failed at 67 foot pounds. The uncoated samples from Set Nos. 3 and 4 failed at a torque of 40 foot pounds, while the coated samples reached a torque of 70 foot pounds prior to failure.

Further comparative tests were carried out using a graphite piece that failed at 26 foot pounds in room temperature tests. Four pieces were thus cut therefrom and were tested at 350° C. in argon plus 3.6% chlorine. One set resulted in torque failures of 31 and 50 foot pounds, respectively, for the uncoated and the Zircar cement coated samples. The other set produced a similar result with the uncoated and the same coated samples failing at 28 and 61 foot pounds, respectively. In another such test under the same conditions and using the same coating, a graphite piece that failed at 30 foot pounds in air was cut into an uncoated sample that failed at 25 foot pounds and a sample from an adjacent location in the original piece that, as in the other tests reported above, had a substantially higher torque strength, failing at twice the strength, i.e. 50 foot pounds.

One graphite shaft that failed at 39 foot pounds in room temperature testing was cut into five pieces. Each piece was tested in argon plus 3.6% chlorine with the following results:

| Piece No. | Coating Material | Test Temp. °C. | Torque to Failure (foot pounds) |
| --- | --- | --- | --- |
| 1 | Sodium silicate No. 1 Mixture | 350 | 85 |
| 2 | Sodium silicate No. 2 Mixture | 450 | 80 |
| 3 | None | 450 | 33 |
| 4 | Zircar Alumina Cement (ground and screened) | 450 | 90 (did not fail) |
| 5 | Same as 4 | 450 | 80-90 |

From the various comparative tests summarized above, it will be seen that the coating of the portion of the upper surface of the graphite shaft contacting the lower seating surface of the metal shaft flange enables an improved threaded connection to be achieved between a graphite shaft and a metal shaft. Such coating of the graphite contacting surface in accordance with the invention thus appreciably strengthens the threaded connection there between so that the ability of the connection to transmit torque is substantially increased. The invention, by enabling the torque capacity of the metal-graphite joint to be improved without necessitating any radical change in design or any increase in the size of the shafts, provides a highly desirable advance in the aluminum refining art. Graphite shafts coated as disclosed and claimed herein thus enable the threaded connection between metal and graphite shafts to withstand substantially higher driving torques and shock loads without the undue breaking of the graphite-metal joint, or the cracking of the graphite shaft as occurs more frequently in conventional aluminum or aluminum alloy refining operations carried out without benefit of the invention.

I claim:

1. In a graphite shaft with a female thread adapted for threaded connection with a metal shaft having a male thread driven so as to tighten the joint between the shafts, said graphite shaft having an end surface, a portion of which comes into contact with a seating surface of a flange portion of said metal shaft upon the fastening of the shafts through said threaded connection, the improvement comprising a coating on said portion of the end surface of the graphite shaft that is positioned to contact said seating surface of the metal shaft flange, said coating comprising a powdered material with individual particles that do not melt, disintegrate, or break up under the conditions of operation, together with a liquid binder phase capable of holding the particles together and bonding them to said graphite surface, with limited absorption of the liquid binder phase into the graphite porosity, said coating serving to substantially increase the friction between the graphite surface to which said coating is bonded and the metal contacting surface upon fastening of said coated graphite shaft with the metal shaft as compared with the friction between comparable uncoated graphite and metal contacting surfaces, whereby the increased friction between the contacting surfaces upon completion of the connection between said coated graphite shaft and said metal shaft results in an increase in the torque streangth of the threaded connection such as to enable said threaded connection to have a greatly increased ability to transmit driving torque from the metal shaft to the graphite shaft.

2. The graphite shaft of claim 1 in which said coating comprises a thin layer of refractory cement.

3. The graphite shaft of claim 2 in which said coating contains alumina to provide the desired friction characteristic between the contacting surfaces.

4. The graphite shaft of claim 3 in which said coating comprises about 70% alumina dispersed in water-based binder.

5. The graphite shaft of claim 4 in which said coating has a thickness of from about 1.2 mils to about 2.0 mils.

6. The graphite shaft of claim 1 in which the coating is present on the overall end surface of such graphite shaft.

7. In a threaded connection between a graphite shaft with a female thread and a metal shaft having a male thread, adapted so that the joint between said shafts is tightened upon the driving of said metal shaft, said graphite shaft having an end surface a portion of which comes into contact with a seating surface of a flange portion of said metal shaft upon the fastening of the shafts through said threaded connection, the improvement comprising a coating on said portion of the end surface of the graphite shaft that is positioned to contact said seating surface of the metal shaft flange, said coating comprising a powdered material with individual particles that do not melt, disintegrate or break up under the conditions of operation, together with a liquid binder phase capable of holding the particles together and bonding them to said graphite surface only, with limited absorption of the liquid binder phase into the graphite porosity, said coating serving to substantially increase the friction between the graphite surface to which said coating is bonded and the metal contacting surface upon the fastening of the shafts through said threaded connection as compared with the friction between the comparable uncoated graphite and metal contacting surface, whereby the increased friction between the contacting surfaces upon completion of the connection between said coated graphite shaft and said metal shaft results in an increase in torque strength of the threaded connection such as to enable said threaded connection to have a greatly increased ability to transmit driving torque from the metal shaft to the graphite shaft.

8. The threaded connection of claim 7 in which said coating comprises a thin layer of refractory cement.

9. The threaded connection of claim 8 in which said coating contains alumina to provide the desired friction characteristic between the contacting surfaces.

10. The threaded connection of claim 9 in which said coating comprises about 70% alumina dispersed in a water-based binder.

11. The threaded connection of claim 10 in which said coating has a thickness of from about 1.2 to about 2 mils.

12. The threaded connection of claim 7 in which the coating is present in the overall end surface of said graphite shaft.

13. The threaded connection of claim 12 in which said coating comprises a thin layer of refractory cement.

14. The threaded connection of claim 7 in which said coated graphite shaft-metal shaft thus fastened together comprises the drive shaft for a rotating nozzle used to disperse a refining gas into a body of molten aluminum.

15. A process for improving the threaded connection between a graphite shaft with a female thread and a metal shaft having a male thread driven so as to tighten the joint between the shafts, wherein said graphite shaft has an end surface, a portion of which comes into contact with a seating surface of a flange portion of said metal shaft upon the fastening of the shafts through said threaded connection, said improvement comprising applying a coating on said portion of the end surface of the graphite shaft that is positioned to contact said seating surface of the metal shaft flange, said coating comprising a powdered material with individual particles that do not melt, disintegrate, or break-up under the conditions of operation, together with a liquid binder phase capable of holding the particles together and bonding them to said graphite surface, with limited absorption of the liquid binder phase into the graphite porosity, said coating serving to substantially increase the friction between the graphite surface to which said coating is bonded and the metal contacting surface upon fastening of said coated graphite shaft with the metal shaft as compared with the friction between the comparable uncoated graphite and metal contacting surfaces, whereby the increased friction between the contacting surfaces upon completion of the connection between said coated graphite shaft and said metal shaft results in an increase in the torque strength of the threaded connection such as to enable said threaded connection to have a greatly increased ability to transmit driving torque from the metal shaft to the graphite shaft.

16. The process of claim 15 in which said coating comprises a thin layer of refractory cement.

17. The process of claim 16 in which said coating contains alumina to provide the desired friction characteristic between the contacting surfaces.

18. The process of claim 17 in which the coating comprises about 70% alumina dispersed in a water-based binder.

19. The process of claim 18 in which said coating has a thickness of from about 1.2 mils to about 2.0 mils.

20. The process of claim 16 in which said thin layer has a thickness of from about 0.5 to about 2.0 mils.

21. The process of claim 15 in which said coating is allowed to dry completely on the graphite surface before the graphite shaft and the metal shaft are joined through said threaded connection.

22. The process of claim 21 in which said coating is allowed to dry in air.

23. The process of claim 15 in which said coating is applied in two steps, the coating having a binder phase a portion of which is absorbed by the porosity of the graphite material during the first coating step, the second coating step serving to replace coating in the areas on which such absorption occurs.

24. The process of claim 23 in which the coating, following such application, is allowed to dry completely in the graphite surface before the graphite shaft and the metal shaft are joined through said threaded connection.

25. The process of claim 24 in which said coating comprises a thin layer of refractory cement.

26. The process of claim 25 in which said coating contains alumina to provide the desired friction characteristic between the contacting surfaces.

27. The process of claim 15 in which the coating is applied to the overall end surface of said graphite shaft.

28. The process of claim 27 in which said coating comprises a thin layer of refractory cement.

* * * * *